(12) United States Patent
Ben Dayan et al.

(10) Patent No.: US 11,782,875 B2
(45) Date of Patent: Oct. 10, 2023

(54) DIRECTORY STRUCTURE FOR A DISTRIBUTED STORAGE SYSTEM

(71) Applicant: Weka.IO Ltd, Tel Aviv (IL)

(72) Inventors: Maor Ben Dayan, Tel Aviv (IL); Omri Palmon, Tel Aviv (IL); Liran Zvibel, Tel Aviv (IL); Kanael Arditti, Tel Aviv (IL)

(73) Assignee: Weka.IO Ltd.

( * ) Notice: Subject to any disclaimer, the term of this patent is extended or adjusted under 35 U.S.C. 154(b) by 379 days.

(21) Appl. No.: 16/121,938

(22) Filed: Sep. 5, 2018

(65) Prior Publication Data

US 2019/0147066 A1 May 16, 2019

Related U.S. Application Data

(60) Provisional application No. 62/585,062, filed on Nov. 13, 2017.

(51) Int. Cl.
*G06F 16/13* (2019.01)
*G06F 3/06* (2006.01)

(52) U.S. Cl.
CPC .............. *G06F 16/13* (2019.01); *G06F 3/061* (2013.01); *G06F 3/0604* (2013.01); *G06F 3/067* (2013.01); *G06F 3/0643* (2013.01); *G06F 3/0667* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 5,956,745 A | 9/1999 | Bradford et al. | |
| 5,960,434 A * | 9/1999 | Schimmel | G06F 16/9014 |
| 6,487,636 B1 | 11/2002 | Dolphin et al. | |
| 7,447,839 B2 | 4/2008 | Uppala | |
| 7,681,072 B1 | 3/2010 | Gibson et al. | |
| 7,793,146 B1 | 9/2010 | Gibson et al. | |
| 7,877,511 B1 | 1/2011 | Berger et al. | |
| 8,347,010 B1 | 1/2013 | Radovanovic | |
| 8,645,749 B2 | 2/2014 | Reche | |
| 8,918,478 B2 | 12/2014 | Ozzie et al. | |
| 9,087,012 B1 | 7/2015 | Hayes et al. | |
| 9,448,887 B1 * | 9/2016 | Ben Dayan | G06F 11/1076 |
| 9,747,162 B2 | 8/2017 | Ben Dayan et al. | |
| 10,592,153 B1 * | 3/2020 | Subramaniam | G06F 3/061 |
| 2003/0115218 A1 | 6/2003 | Bobbitt et al. | |

(Continued)

OTHER PUBLICATIONS

Int'l Search Report and Written Opinion Appln No. PCT/IB2016/001177 dated Dec. 2, 2016.

(Continued)

*Primary Examiner* — Tracy C Chan
(74) *Attorney, Agent, or Firm* — McAndrews, Held & Malloy, Ltd.

(57) ABSTRACT

A plurality of computing devices are communicatively coupled to each other via a network, and each of the plurality of computing devices is operably coupled to one or more flash storage devices. Each computing device is operable to access one or more memory blocks within the flash storage devices and maintain a directory structure for managing access to the memory. The directory structure may be adaptively resized according to the addition or removal of one or more associated files stored in memory.

20 Claims, 8 Drawing Sheets

(56) References Cited

U.S. PATENT DOCUMENTS

| | | | |
|---|---|---|---|
| 2003/0159015 A1* | 8/2003 | Tamatsu | G06F 16/22 |
| | | | 711/221 |
| 2003/0163630 A1* | 8/2003 | Aasheim | G06F 12/0246 |
| | | | 711/103 |
| 2003/0196047 A1 | 10/2003 | Kessler et al. | |
| 2004/0098415 A1 | 5/2004 | Bone et al. | |
| 2005/0289152 A1 | 12/2005 | Earl et al. | |
| 2007/0061542 A1 | 3/2007 | Uppala | |
| 2007/0143261 A1 | 6/2007 | Uppala | |
| 2007/0143311 A1 | 6/2007 | Uppala | |
| 2009/0119541 A1 | 5/2009 | Inoue et al. | |
| 2010/0174690 A1* | 7/2010 | Marcotte | G06F 16/178 |
| | | | 707/E17.01 |
| 2010/0199125 A1 | 8/2010 | Reche | |
| 2011/0213994 A1 | 9/2011 | Thereska et al. | |
| 2012/0124282 A1 | 5/2012 | Frank et al. | |
| 2012/0210095 A1 | 8/2012 | Nellans et al. | |
| 2013/0103729 A1* | 4/2013 | Cooney | G06F 16/24568 |
| | | | 707/831 |
| 2013/0218934 A1* | 8/2013 | Lin | G06F 16/182 |
| | | | 707/828 |
| 2013/0290948 A1* | 10/2013 | Gokhale | G06F 8/60 |
| | | | 717/172 |
| 2014/0244897 A1 | 8/2014 | Goss et al. | |
| 2014/0281280 A1 | 9/2014 | Goss et al. | |
| 2015/0248366 A1 | 9/2015 | Bergsten et al. | |
| 2015/0254088 A1 | 9/2015 | Chou et al. | |
| 2015/0355971 A1 | 12/2015 | Becker-Szendy et al. | |
| 2016/0246677 A1 | 8/2016 | Sangamkar et al. | |
| 2017/0052847 A1* | 2/2017 | Ben Dayan | G06F 3/064 |
| 2017/0139596 A1* | 5/2017 | Hack | G06F 3/064 |

OTHER PUBLICATIONS

Int'l Preliminary Report on Patentability Appln No. PCT/IB2016/001177 dated Mar. 8, 2018.

Int'l Search Report and Written Opinion Appln No. PCT/IB2016/000996 dated Oct. 20, 2016.

Int'l Preliminary Report on Patentability Appln No. PCT/IB2016/000996 dated Jan. 2, 2018.

Extended European Search Report Appln No. 16817312.8-1217 dated Oct. 25, 2018.

Int'l Search Report and Written Opinion Appln No. PCT/IB2018/001229 dated Mar. 5, 2019.

Chaiken et al. "LimitlESS directories: A scalable cache coherence scheme." Jun. 1991 (Jun. 1991) Retrieved on Feb. 18, 2019 (Feb. 18, 2019) from <https:llapps.dtic.mil/dtic/tr/fulltexUu2/a237629.pdf> entire document (24 pgs).

Int'l Preliminary Report on Patentability Appln No. PCT/IB2018/001229 dated May 28, 2020.

European Office Communication with extended search report Appln No. 18877259.4 dated Jul. 22, 2021.

\* cited by examiner

Note: the order of the keys returned by readdir() is bit-reversed compared to the order within the ODH block

DIRECTORY STRUCTURE FOR A DISTRIBUTED STORAGE SYSTEM

PRIORITY CLAIM

This application claims priority to the following application, which is hereby incorporated herein by reference: U.S. provisional patent application 62/585,062 titled "Directory Structure For A Distributed Storage System" filed on Nov. 13, 2017.

BACKGROUND

Limitations and disadvantages of conventional approaches to data storage will become apparent to one of skill in the art, through comparison of such approaches with some aspects of the present method and system set forth in the remainder of this disclosure with reference to the drawings.

INCORPORATION BY REFERENCE

U.S. patent application Ser. No. 15/243,519 titled "Distributed Erasure Coded Virtual File System" is hereby incorporated herein by reference in its entirety.

BRIEF SUMMARY

Methods and systems are provided for a directory structure in a distributed storage system substantially as illustrated by and/or described in connection with at least one of the figures, as set forth more completely in the claims.

DETAILED DESCRIPTION

The systems in this disclosure are applicable to small clusters and can also scale to many, many thousands of nodes. An example embodiment is discussed regarding non-volatile memory (NVM), for example, flash memory that comes in the form of a solid-state drive (SSD). The NVM may be divided into 4 kB "blocks" and 128 MB "chunks." "Extents" may be stored in volatile memory, e.g., RAM for fast access, backed up by NVM storage as well. An extent may store pointers for blocks, e.g., 256 pointers to 1 MB of data stored in blocks. In other embodiments, larger or smaller memory divisions may also be used. Metadata functionality in this disclosure may be effectively spread across many servers. For example, in cases of "hot spots" where a large load is targeted at a specific portion of the filesystem's namespace, this load can be distributed across a plurality of nodes.

Figure 1:
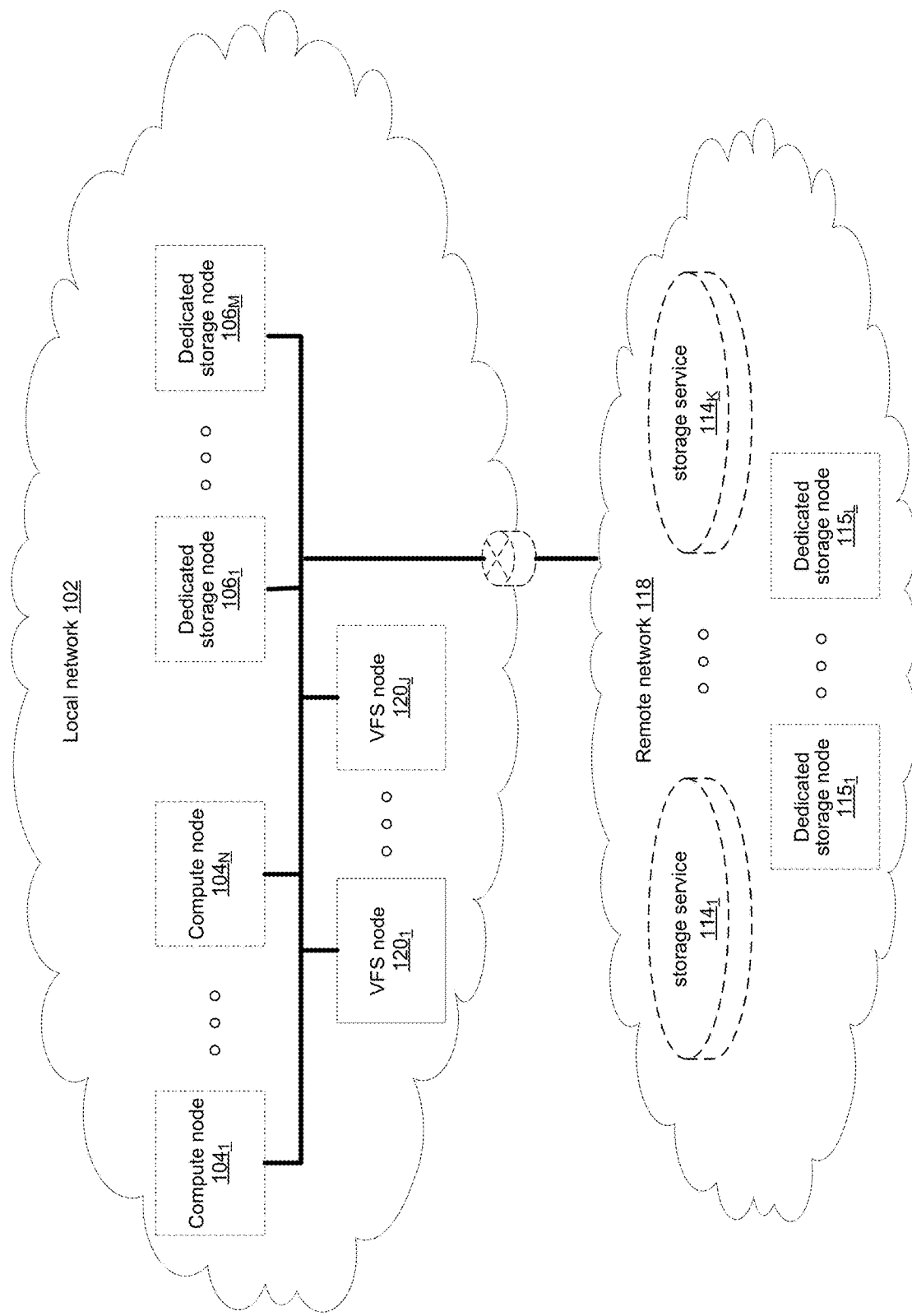
FIG. 1 illustrates various example configurations of a virtual file system in accordance with aspects of this disclosure.

FIG. 1 illustrates various example configurations of a virtual file system (VFS) in accordance with aspects of this disclosure. Shown in FIG. 1 is a local area network (LAN) 102 comprising one or more VFS nodes 120 (indexed by integers from 1 to J, for $j \geq 1$), and optionally comprising (indicated by dashed lines): one or more dedicated storage nodes 106 (indexed by integers from 1 to M, for $M \geq 1$), one or more compute nodes 104 (indexed by integers from 1 to N, for $N \geq 1$), and/or an edge router that connects the LAN 102 to a remote network 118. The remote network 118 optionally comprises one or more storage services 114 (indexed by integers from 1 to K, for $K \geq 1$), and/or one or more dedicated storage nodes 115 (indexed by integers from 1 to L, for $L \geq 1$).

Each VFS node $120_j$ (j an integer, where $1 \leq j \leq J$) is a networked computing device (e.g., a server, personal computer, or the like) that comprises circuitry for running VFS processes and, optionally, client processes (either directly on an operating system of the device $104_n$ and/or in one or more virtual machines running in the device $104_n$).

The compute nodes 104 are networked devices that may run a VFS frontend without a VFS backend. A compute node 104 may run VFS frontend by taking an SR-IOV into the NIC and consuming a complete processor core. Alternatively, the compute node 104 may run the VFS frontend by routing the networking through a Linux kernel networking stack and using kernel process scheduling, thus not having the requirement of a full core. This is useful if a user does not want to allocate a complete core for the VFS or if the networking hardware is incompatible with the VFS requirements.

Figure 2:
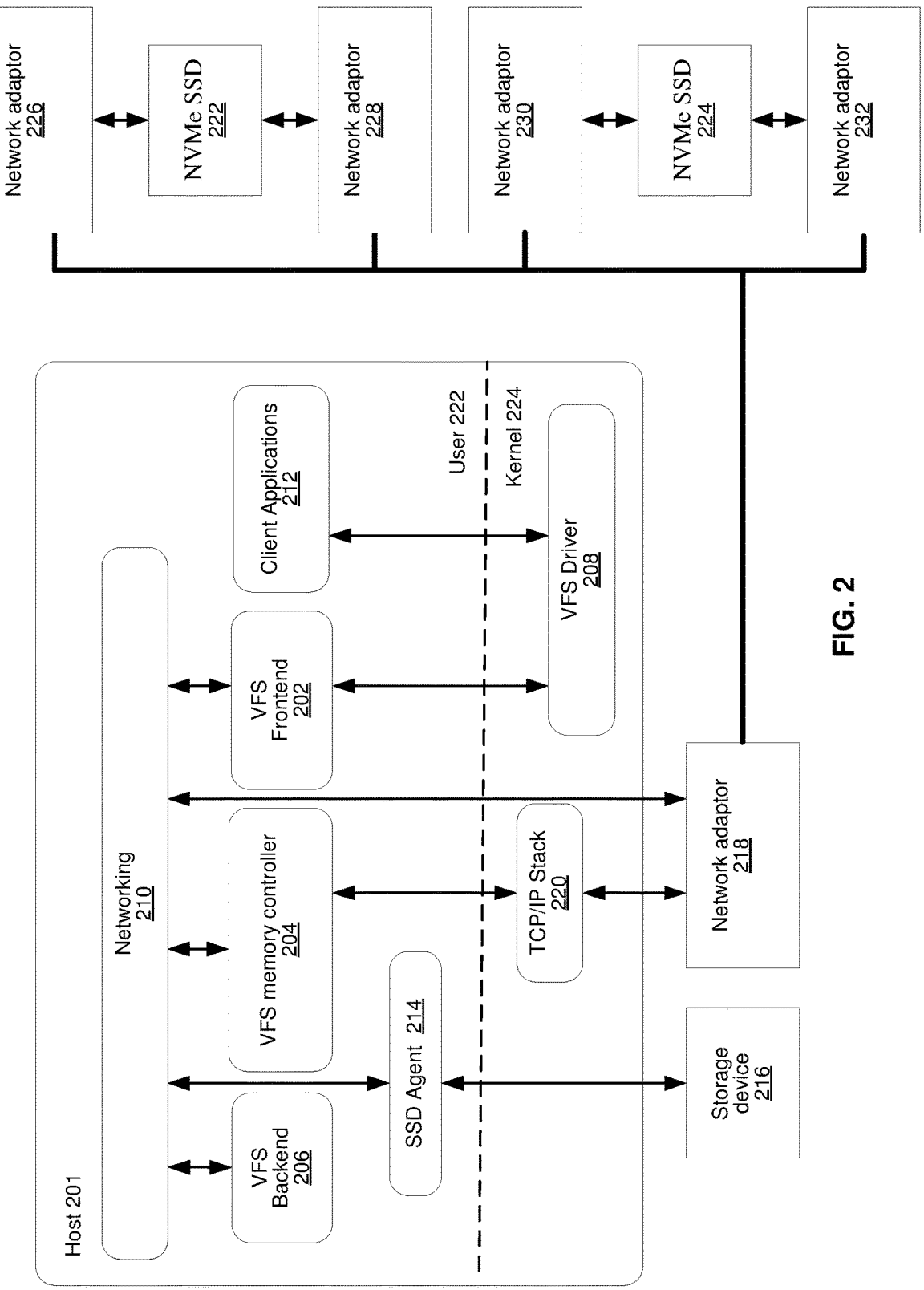
FIG. 2 illustrates an example configuration of a virtual file system node in accordance with aspects of this disclosure.

FIG. 2 illustrates an example configuration of a VFS node in accordance with aspects of this disclosure. A VFS node comprises a VFS frontend 202 and driver 208, a VFS memory controller 204, a VFS backend 206, and a VFS SSD agent 214. As used in this disclosure, a "VFS process" is a process that implements one or more of: the VFS frontend 202, the VFS memory controller 204, the VFS backend 206, and the VFS SSD agent 214. Thus, in an example implementation, resources (e.g., processing and memory resources) of the VFS node may be shared among client processes and VFS processes. The processes of the VFS may be configured to demand relatively small amounts of the resources to minimize the impact on the performance of the client applications. The VFS frontend 202, the VFS memory controller 204, and/or the VFS backend 206 and/or the VFS SSD agent 214 may run on a processor of the host 201 or on a processor of the network adaptor 218. For a multi-core processor, different VFS process may run on different cores, and may run a different subset of the services. From the perspective of the client process(es) 212, the interface with the virtual file system is independent of the particular physical machine(s) on which the VFS process(es) are running. Client processes only require driver 208 and frontend 202 to be present in order to serve them.

The VFS node may be implemented as a single tenant server (e.g., bare-metal) running directly on an operating system or as a virtual machine (VM) and/or container (e.g., a Linux container (LXC)) within a bare-metal server. The VFS may run within an LXC container as a VM environment. Thus, inside the VM, the only thing that may run is the LXC container comprising the VFS. In a classic bare-metal environment, there are user-space applications and the VFS runs in an LXC container. If the server is running other containerized applications, the VFS may run inside an LXC container that is outside the management scope of the container deployment environment (e.g. Docker).

The VFS node may be serviced by an operating system and/or a virtual machine monitor (VMM) (e.g., a hypervisor). The VMM may be used to create and run the VFS node on a host 201. Multiple cores may reside inside the single LXC container running the VFS, and the VFS may run on a single host 201 using a single Linux kernel. Therefore, a single host 201 may comprise multiple VFS frontends 202, multiple VFS memory controllers 204, multiple VFS backends 206, and/or one or more VFS drivers 208. A VFS driver 208 may run in kernel space outside the scope of the LXC container.

A single root input/output virtualization (SR-IOV) PCIe virtual function may be used to run the networking stack 210 in user space 222. SR-IOV allows the isolation of PCI Express, such that a single physical PCI Express can be shared on a virtual environment and different virtual functions may be offered to different virtual components on a single physical server machine. The I/O stack 210 enables the VFS node to bypasses the standard TCP/IP stack 220 and communicate directly with the network adapter 218. A Portable Operating System Interface for uniX (POSIX) VFS functionality may be provided through lockless queues to the VFS driver 208. SR-IOV or full PCIe physical function address may also be used to run non-volatile memory express (NVMe) driver 214 in user space 222, thus bypassing the Linux IO stack completely. NVMe may be used to access non-volatile storage media 216 attached via a PCI Express (PCIe) bus. The non-volatile storage media 220 may be, for example, flash memory that comes in the form of a solid-state drive (SSD) or Storage Class Memory (SCM) that may come in the form of an SSD or a memory module (DIMM). Other example may include storage class memory technologies such as 3D-XPoint.

The SSD may be implemented as a networked device by coupling the physical SSD 216 with the SSD agent 214 and networking 210. Alternatively, the SSD may be implemented as a network-attached NVMe SSD 222 or 224 by using a network protocol such as NVMe-oF (NVMe over Fabrics). NVMe-oF may allow access to the NVMe device using redundant network links, thereby providing a higher level or resiliency. Network adapters 226, 228, 230 and 232 may comprise hardware acceleration for connection to the NVMe SSD 222 and 224 to transform them into networked NVMe-oF devices without the use of a server. The NVMe SSDs 222 and 224 may each comprise two physical ports, and all the data may be accessed through either of these ports.

Each client process/application 212 may run directly on an operating system or may run in a virtual machine and/or container serviced by the operating system and/or hypervisor. A client process 212 may read data from storage and/or write data to storage in the course of performing its primary function. The primary function of a client process 212, however, is not storage-related (i.e., the process is only concerned that its data is reliably stored and is retrievable when needed, and not concerned with where, when, or how the data is stored). Example applications which give rise to such processes include: email servers, web servers, office productivity applications, customer relationship management (CRM), animated video rendering, genomics calculation, chip design, software builds, and enterprise resource planning (ERP).

A client application 212 may make a system call to the kernel 224 which communicates with the VFS driver 208. The VFS driver 208 puts a corresponding request on a queue of the VFS frontend 202. If several VFS frontends exist, the driver may load balance accesses to the different frontends, making sure a single file/directory is always accessed via the same frontend. This may be done by "sharding" the frontend based on the ID of the file or directory. The VFS frontend 202 provides an interface for routing file system requests to an appropriate VFS backend based on the bucket that is responsible for that operation. The appropriate VFS backend may be on the same host or it may be on another host.

The VFS backend 206 hosts several buckets, each one of them services the file system requests that it receives and carries out tasks to otherwise manage the virtual file system (e.g., load balancing, journaling, maintaining metadata, caching, moving of data between tiers, removing stale data, correcting corrupted data, etc.)

The VFS SSD agent 214 handles interactions with a respective storage device 216. This may include, for example, translating addresses, and generating the commands that are issued to the storage device (e.g., on a SATA, SAS, PCIe, or other suitable bus). Thus, the VFS SSD agent 214 operates as an intermediary between a storage device 216 and the VFS backend 206 of the virtual file system. The SSD agent 214 could also communicate with a standard network storage device supporting a standard protocol such as NVMe-oF (NVMe over Fabrics).

Figure 3:
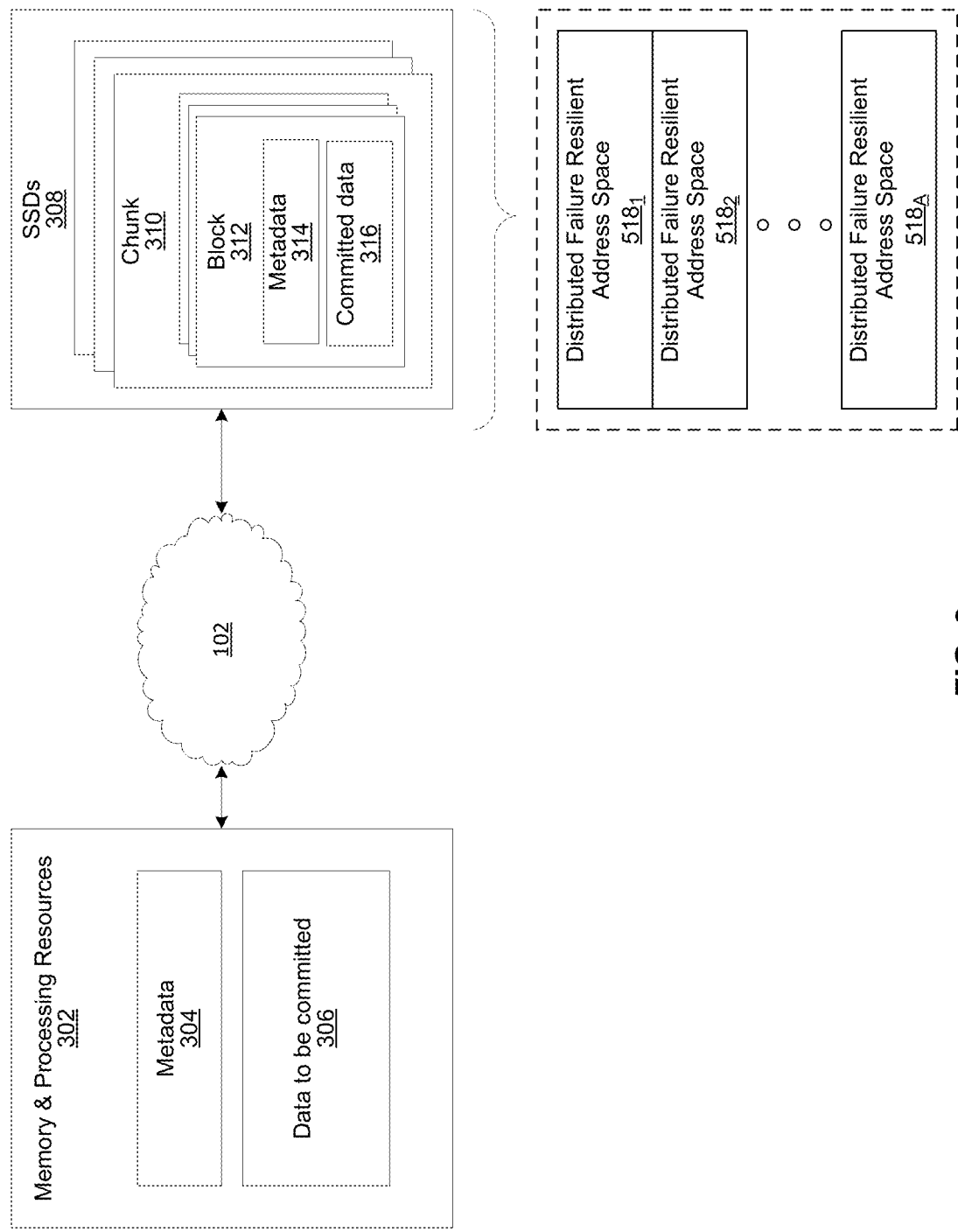
FIG. 3 illustrates another representation of a virtual file system in accordance with an example implementation of this disclosure.

FIG. 3 illustrates another representation of a virtual file system in accordance with an example implementation of this disclosure. In FIG. 3, the element 302 represents memory resources (e.g., DRAM and/or other short-term memory) and processing (e.g., x86 processor(s), ARM processor(s), NICs, ASICs, FPGAs, and/or the like) resources of various node(s) (compute, storage, and/or VFS) on which resides a virtual file system, such as described regarding FIG. 2 above. The element 308 represents the one or more physical storage devices 216 which provide the long term storage of the virtual file system.

As shown in FIG. 3, the physical storage is organized into a plurality of distributed failure resilient address spaces (DFRASs) 518. Each of which comprises a plurality of chunks 310, which in turn comprises a plurality of blocks 312. The organization of blocks 312 into chunks 310 is only a convenience in some implementations and may not be done in all implementations. Each block 312 stores committed data 316 (which may take on various states, discussed below) and/or metadata 314 that describes or references committed data 316.

The organization of the storage 308 into a plurality of DFRASs enables high performance parallel commits from many—perhaps all—of the nodes of the virtual file system (e.g., all nodes $104_1$-$104_N$, $106_1$-$106_M$, and $120_1$-$120_J$ of FIG. 1 may perform concurrent commits in parallel). In an example implementation, each of the nodes of the virtual file system may own a respective one or more of the plurality of DFRAS and have exclusive read/commit access to the DFRASs that it owns.

Each bucket owns a DFRAS, and thus does not need to coordinate with any other node when writing to it. Each bucket may build stripes across many different chunks on many different SSDs, thus each bucket with its DFRAS can choose what "chunk stripe" to write to currently based on many parameters, and there is no coordination required in order to do so once the chunks are allocated to that bucket. All buckets can effectively write to all SSDs without any need to coordinate.

Each DFRAS being owned and accessible by only its owner bucket that runs on a specific node allows each of the nodes of the VFS to control a portion of the storage 308 without having to coordinate with any other nodes (except during [re]assignment of the buckets holding the DFRASs during initialization or after a node failure, for example, which may be performed asynchronously to actual reads/commits to storage 308). Thus, in such an implementation, each node may read/commit to its buckets' DFRASs independently of what the other nodes are doing, with no requirement to reach any consensus when reading and committing to storage 308. Furthermore, in the event of a failure of a particular node, the fact the particular node owns a plurality of buckets permits more intelligent and efficient redistribution of its workload to other nodes (rather than the whole workload having to be assigned to a single node, which may create a "hot spot"). In this regard, in some implementations the number of buckets may be large relative to the number of nodes in the system such that any one bucket may be a relatively small load to place on another node. This permits fine grained redistribution of the load of a failed node according to the capabilities and capacity of the other nodes (e.g., nodes with more capabilities and capacity may be given a higher percentage of the failed nodes buckets).

To permit such operation, metadata may be maintained that maps each bucket to its current owning node such that reads and commits to storage 308 can be redirected to the appropriate node.

Load distribution is possible because the entire filesystem metadata space (e.g., directory, file attributes, content range in the file, etc.) can be broken (e.g., chopped or sharded) into small, uniform pieces (e.g., "shards"). For example, a large system with 30 k servers could chop the metadata space into 128 k or 256 k shards.

Each such metadata shard may be maintained in a "bucket." Each VFS node may have responsibility over several buckets. When a bucket is serving metadata shards on a given backend, the bucket is considered "active" or the "leader" of that bucket. Typically, there are many more buckets than VFS nodes. For example, a small system with 6 nodes could have 120 buckets, and a larger system with 1,000 nodes could have 8 k buckets.

Each bucket may be active on a small set of nodes, typically 5 nodes that that form a penta-group for that bucket. The cluster configuration keeps all participating nodes up-to-date regarding the penta-group assignment for each bucket.

Each penta-group monitors itself. For example, if the cluster has 10 k servers, and each server has 6 buckets, each server will only need to talk with 30 different servers to maintain the status of its buckets (6 buckets will have 6 penta-groups, so 6*5=30). This is a much smaller number than if a centralized entity had to monitor all nodes and keep a cluster-wide state. The use of penta-groups allows performance to scale with bigger clusters, as nodes do not perform more work when the cluster size increases. This could pose a disadvantage that in a "dumb" mode a small cluster could actually generate more communication than there are physical nodes, but this disadvantage is overcome by sending just a single heartbeat between two servers with all the buckets they share (as the cluster grows this will change to just one bucket, but if you have a small 5 server cluster then it will just include all the buckets in all messages and each server will just talk with the other 4). The penta-groups may decide (i.e., reach consensus) using an algorithm that resembles the Raft consensus algorithm.

Each bucket may have a group of compute nodes that can run it. For example, five VFS nodes can run one bucket. However, only one of the nodes in the group is the controller/leader at any given moment. Further, no two buckets share the same group, for large enough clusters. If there are only 5 or 6 nodes in the cluster, most buckets may share backends. In a reasonably large cluster there many distinct node groups. For example, with 26 nodes, there are more than $$64,000 \left( \frac{26!}{5! * (26-5)!} \right)$$

possible five-node groups (i.e., penta-groups).

All nodes in a group know and agree (i.e., reach consensus) on which node is the actual active controller (i.e., leader) of that bucket. A node accessing the bucket may remember ("cache") the last node that was the leader for that bucket out of the (e.g., five) members of a group. If it accesses the bucket leader, the bucket leader performs the requested operation. If it accesses a node that is not the current leader, that node indicates the leader to "redirect" the access. If there is a timeout accessing the cached leader node, the contacting node may try a different node of the same penta-group. All the nodes in the cluster share common "configuration" of the cluster, which allows the nodes to know which server may run each bucket.

Each bucket may have a load/usage value that indicates how heavily the bucket is being used by applications running on the filesystem. For example, a server node with 11 lightly used buckets may receive another bucket of metadata to run before a server with 9 heavily used buckets, even though there will be an imbalance in the number of buckets used. Load value may be determined according to average response latencies, number of concurrently run operations, memory consumed or other metrics.

Redistribution may also occur even when a VFS node does not fail. If the system identifies that one node is busier than the others based on the tracked load metrics, the system can move (i.e., "fail over") one of its buckets to another server that is less busy. However, before actually relocating a bucket to a different host, load balancing may be achieved by diverting writes and reads. Since each write may end up on a different group of nodes, decided by the DFRAS, a node with a higher load may not be selected to be in a stripe to which data is being written. The system may also opt to not serve reads from a highly loaded node. For example, a "degraded mode read" may be performed, wherein a block in the highly loaded node is reconstructed from the other blocks of the same stripe. A degraded mode read is a read that is performed via the rest of the nodes in the same stripe, and the data is reconstructed via the failure protection. A degraded mode read may be performed when the read latency is too high, as the initiator of the read may assume that that node is down. If the load is high enough to create higher read latencies, the cluster may revert to reading that data from the other nodes and reconstructing the needed data using the degraded mode read.

Each bucket manages its own distributed erasure coding instance (i.e., DFRAS 518) and does not need to cooperate with other buckets to perform read or write operations. There are potentially thousands of concurrent, distributed erasure coding instances working concurrently, each for the different bucket. This is an integral part of scaling performance, as it effectively allows any large filesystem to be divided into independent pieces that do not need to be coordinated, thus providing high performance regardless of the scale.

Each bucket handles all the file systems operations that fall into its shard. For example, the directory structure, file attributes and file data ranges will fall into a particular bucket's jurisdiction.

An operation done from any frontend starts by finding out what bucket owns that operation. Then the backend leader, and the node, for that bucket is determined. This determination may be performed by trying the last-known leader. If the last-known leader is not the current leader, that node may know which node is the current leader. If the last-known leader is not part of the bucket's penta-group anymore, that backend will let the front end know that it should go back to the configuration to find a member of the bucket's penta-group. The distribution of operations allows complex operations to be handled by a plurality of servers, rather than by a single computer in a standard system.

An on-disk hash (ODH) may manage hash tables implemented over 4 k registry pages. These hash tables may have keys and values (e.g., <KEY, VALUE> pairs, key-value entries) of various sizes, supporting many other higher level data-structures that run inside (and across) buckets.

The disclosed system may support many hash tables of the same kind (with a different object ID) stored over the same registry or different kind of hash tables stored over the same registry. The hash may be based on a cryptographic hashing function and provides a unique signature of each hash kind and instance. The registry key for the ODH may be based on the type of hash, the ID of hash instance, and a block index. Because the registry (comprising e.g., block indices) is stored in RAM, it is efficient to look for a 4 k block and find out whether it exists or not.

The ODH is an expandable (and collapsible) hash implemented efficiently over 4 k blocks that are stored in the registry. Therefore, the number of 4 k blocks used is proportional to the amount data that is stored on the ODH.

The ODH has dynamic structures based on the KEY and VALUE types, and stores the hash information as a sorted <KEY, VALUE> array that allows for an efficient binary search over. The sorting is done based on a cryptographic hash signature of the key and not the key itself, to ensure uniform spread of the sorting criterion across all bits. Because the hash set may consume more than what would fit in a single 4 k block, a mechanism for expanding and collapsing the hash set is required.

Because there are potentially thousands of concurrent, DFRASs working concurrently, a scalable directory structure is utilized. The directory structure for the distributed storage system of the current disclosure is divided into independent directory slices that do not need to be centrally coordinated, thereby providing high performance regardless of the scale.

The directory structure is implemented using ODHs. The registry key for each ODH blocks will be type=Dir, inodeID, block index. Each <KEY, VALUE> entry in the ODH will correspond to a hash calculated over a filename (i.e., the "key") and an inodeID (i.e., the "value"). Therefore, the hash of the filename is used to lookup the inodeID (if it exits).

Figure 4:
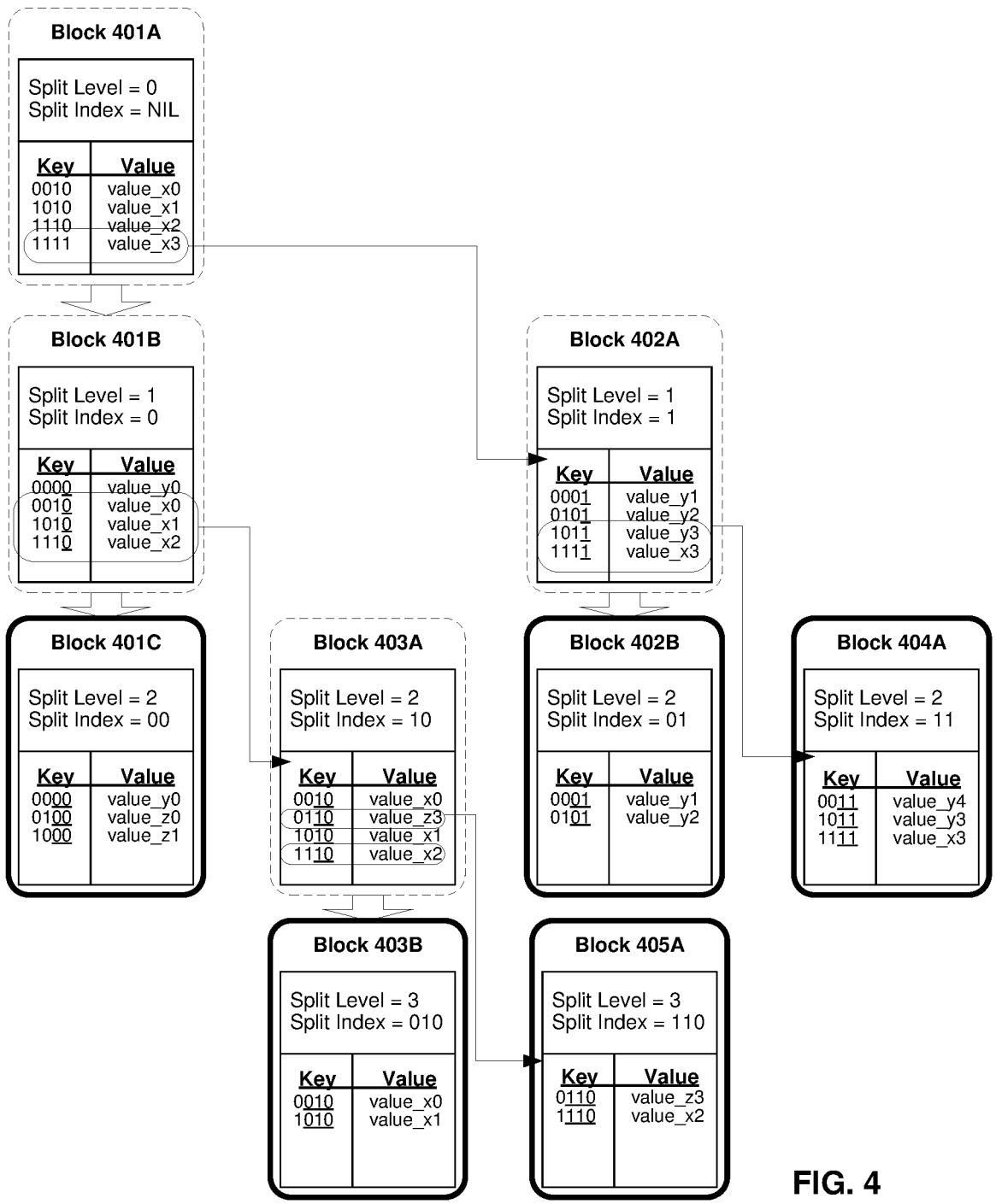
FIG. 4 illustrates an example of splitting blocks of a flash registry using on-disk hashing in accordance with an example implementation of this disclosure.

FIG. 4 illustrates an example of splitting blocks of a flash registry using ODH in accordance with an example implementation of this disclosure. A table of 400 entries and 10 bytes per entry (e.g., two bytes for key, 8 bytes for value) may be implemented in each 4 kB ODH registry block. For illustration purposes, the registry blocks in FIG. 4 is shown with a maximum of four <KEY, VALUE> entries. In addition to the local hash table of <KEY, VALUE> pairs, each ODH registry block may comprise header information that indicates an index and a split level. The split level may be stored inside the block apart from the "key" (or hash of the block).

The elements of each ODH block are sorted by the key and may be serialized one after the other.

The ODH registry blocks are stored over the DFRAS. Set/get operations are implemented by the ODH, which is several layers "higher" than the DFRAS. The ODH assumes that there is a functioning registry that provides the service of storing the ODH 4$k$ data based on the index for each such page. This also achieves write leveling when an ODH page is updated.

As long as the number of entries fits within one block, the code may look up the ODH by searching a single block. With the type and instance ID, the ODH may enumerate the <KEY, VALUE> pairs in the block until it finds the right pair.

When the block fills up, it increases the split level, and moves some of the entries to a new block based on the cryptographic hash. The entries are moved to the blocks by the least significant bits (LSBs) of the hash of the key. The LSBs that match the index remain, and the LSB that match the new block (with added "1") move to the new block. Because sorting and moving is based on the hash of the keys and such hashes generate a uniform distribution of hashed values, about half of the entries would remain in the original block, and half of the entries would be migrated to the newly created block.

The ODH may be created using one registry block 401A without a hash index at split level 0<index=NIL, split=1>. The LSBs of the keys in the first four ODH entries are 0010, 1010, 1110, and 1111, and the corresponding values are value_x0, value_x1, value_x2, and value_x3 respectively.

When splitting blocks, a new block is added and the existing block does not change its address. This maintains an "anchor" for finding data. After a split, the anchor block is the block with an index that begins with "0", because when adding a leading "0" to a number the value of that number does not change, thus the address of that block does not actually change.

In FIG. 4, when registry block 401A is split, a new block 402A is added with header information <index=1b, split=1>. The <KEY, VALUE> pairs in existing block 401A that end in "1" are moved into the new block 402A. The <KEY, VALUE> pairs in existing block 401A that end in "0" remain in the hash table, and the header information is changed from <index=NIL, split=0> to <index=0b, split=1>. For illustration purposes, after block 401A is split, it is designated as block 401B, although the physical memory address of the block does not change.

After block 401A is split, ODH registry block 401B receives <KEY, VALUE> pair (0000, value_y0). Because registry block 401B has reached its capacity, registry block 401B is split and a new block 403A is added with header information <index=10b, split=2>. The <KEY, VALUE> pairs in existing block 401B that end in "10" are moved into the new block 403A. The <KEY, VALUE> pairs in existing block 401A that end in "00" remain in the hash table, and the header information is changed from <index=0b, split=1> to <index=00b, split=2>. For illustration purposes, after block 401B is split, it is designated as block 401C.

After being split from block 401A, ODH registry block 402A receives <KEY, VALUE> pairs (0001, value_y1), (0101, value_y2) and (1011, value_y3). Because registry block 402A has reached its capacity, registry block 402A is split and a new block 404A is added with header information <index=11b, split=2>. The <KEY, VALUE> pairs in existing block 402A that end in "11" are moved into the new block 404A. The <KEY, VALUE> pairs in existing block 401A that end in "01" remain in the hash table, and the header information is changed from <index=1b, split=1> to <index=01b, split=2>. For illustration purposes, after block 402A is split, it is designated as block 402B.

After being split from block 401B, ODH registry block 403A receives <KEY, VALUE> pair (0110, value_z3). Because registry block 403A has reached its capacity, registry block 403A is split and a new block 405A is added. The <KEY, VALUE> pairs in existing block 403a that end in "110" are moved into the new block 405A with header information <index=110b, split=3>. The <KEY, VALUE> pairs in existing block 403A that end in "010" remain in the hash table, and the header information is changed from <index=10b, split=2> to <index=010b, split=3>. For illustration purposes, after block 403A is split, it is designated as block 403B.

After block 401B is split, ODH registry block 401C receives <KEY, VALUE> pairs (0100, value_z0) and (1000, value_z1). Because registry block 401C has not reached its capacity, splitting is not required.

FIG. 4 illustrates an ODH in a single bucket that is handled by a single backend (and a single CPU core). Because directories also span multiple buckets and multiple servers, a single directory cannot be allowed to become a bottleneck on performance. If a single bucket (and thus a single registry and a single ODH within that registry) were to handle the entire directory, the size of the directory and the amount of activity that directory could store would be limited. Thus, directory operations span several buckets to be efficient and effective.

Figure 5:
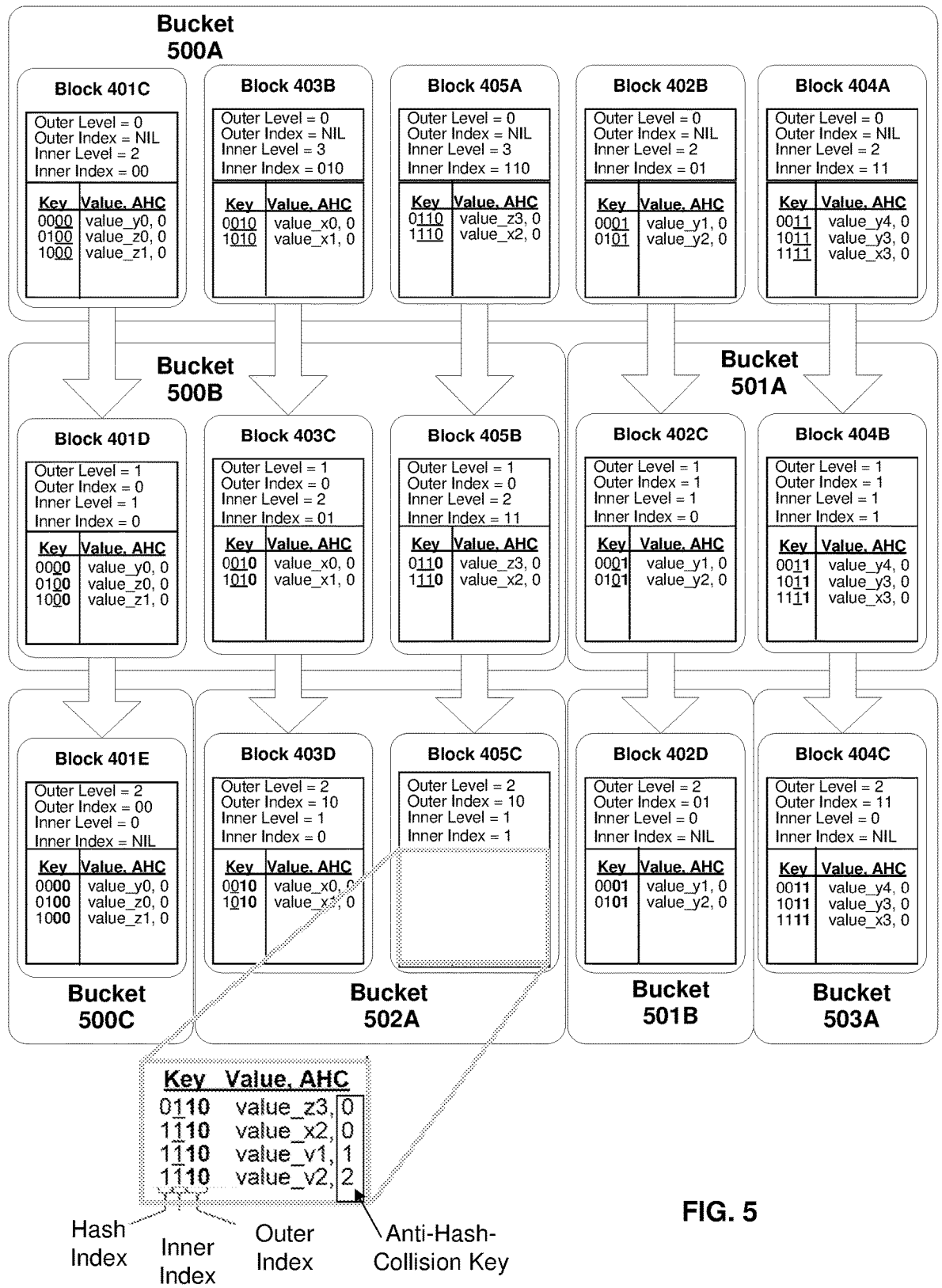
FIG. 5 illustrates an example of splitting buckets of a flash registry using on-disk hashing in accordance with an example implementation of this disclosure.

FIG. 5 illustrates an example of splitting buckets of a flash registry using on-disk hashing in accordance with an example implementation of this disclosure. The algorithm works similarly to a single ODH per bucket, but instead of just having one split level, it has two split levels. The inner split level is the split level discussed above, and the outer split level is a split level across buckets. An outer split level and an inner split level start at 0.

A "directory slice" is a piece of a directory in a bucket. The system decides how many file entries may be stored in a single bucket (e.g., 1 M). When the outer split is increased (i.e., a directory slice is pushed to a different bucket), the inner split is decreased.

Following the splits described regarding FIG. 4, the ODH comprises block 401C, block 403B, block 405A, block 402B, and block 404A. All five of these ODH blocks may be located on a single bucket 500A. For illustration purposes, bucket 500A and bucket 500B are the same logical buckets. Bucket 500B represents bucket 500A after a bucket split.

When a bucket split condition has been determined for the ODH, the ODH of bucket 500A can be split into buckets 500B and 501A, where bucket 501A is a new bucket.

A strong property of this bucket splitting is that just half of the 4 k blocks have to move to a new bucket, and half of the blocks remain. This is true for both splitting the ODH and splitting the whole bucket. If the ODH is split as in FIG. 4, half blocks relocate to another existing bucket. If a bucket with all its ODH's are split, each ODH will leave half of the <KEY, VALUE> entries with the original bucket, and half of the <KEY, VALUE> entries will be relocated to the new bucket.

The split may be determined according to the LSBs of the keys in each block. For illustration purposes, after a bucket is split, the corresponding blocks are designated with a new version number (e.g., 401C becomes 401D), although the physical memory address of the blocks may not change. Additionally, the split level (corresponding to the index width) is reduced.

The LSB of the keys in blocks 401C, 403B and 405A is "0" (corresponding to bucket 500). These blocks are relabeled as blocks 401D, 403C and 405B respectively and remain in the same bucket (i.e., bucket 500A relabeled as bucket 500B) after the ODH on bucket 500A is split.

The LSB of the keys in blocks 402B and 404A is "1" (corresponding new bucket 501). These blocks are relabeled as blocks 402C and 404B respectively and are moved to bucket 501A (bucket "1") after bucket 500A is split.

When the ODH that now resides on buckets 500B and 501A is split further, two LSBs of the keys are considered. The two LSBs of the keys in block 401D are "00" (corresponding to bucket 500). Block 401D is relabeled as block 401E and remains in the same bucket (i.e., bucket 500B relabeled as bucket 500C) after the ODH on bucket 500B (bucket "0") is split.

The two LSBs of the keys in blocks 403C and 405B are "10" (corresponding to new bucket 502). Blocks 403C and 405B are relabeled as blocks 403D and 405C and are moved to bucket 502A (bucket "10") after the ODH on bucket 500B (bucket "0") is split.

The two LSBs of the keys in block 402C are "01" (corresponding to bucket 501). Block 402C is relabeled as block 402D and remains in the same bucket (i.e., bucket 501A relabeled as bucket 501B) after the ODH on bucket 501A (bucket "1") is split.

The two LSBs of the keys in block 404B are "11" (corresponding to new bucket 503). Block 404B is relabeled as block 404C and is moved to bucket 503A (bucket "11") after the ODH on bucket 501A (bucket "1") is split.

The outer split index is found in the least significant bits of the hash. The number of bits in the outer split index is indicated by the outer split level. The inner split index is found in the least significant bits next to the bits of the outer split index. In Block 405A, for example, the outer split level is 0 (i.e., a single bucket case) and the inner split level is 3 and the hash of the first entry is "0110," the outer split index is NIL (i.e., no bits), the inner split index is "110" and the hash index is "1". If bucket 500A is split, the outer split level of all of the blocks (401C, 403B, 405A, 402B, and 404A) increases by 1, and the inner split level decreases by 1. After a bucket split, block 405A (relabeled as block 405B) remains in the same bucket, i.e., bucket 500A (relabeled as bucket 500B). The outer split index changes from "NIL" (in block 405A) to "1" (in block 405B). The inner split index of block 405B changes from "110" (in block 405A) to "11" (in block 405B). And the hash index of the first entry in block 405B remains "1".

When the outer split level is increased and the inner split level is decreased, one or more complete blocks are moved to the next bucket. All blocks with an inner split index that ends with 1 (e.g., blocks 402B and 404A) are moved to the new bucket. All blocks with an inner split index that ends with 0 (e.g., blocks 401C, 403B, and 405A) stay in the same bucket. Each ODH block remembers block ID, inner split index (and/or inner split level), and outer split index (and/or outer split level).

Because there may be a hash collision for two or more entries in a directory, each entry gets an "anti-hash-collision" key. The anti-hash-collision key is 0 if no two entries have the same hash. Therefore, the ODH maps the hash to a value and an anti-hash-collision (AHC) index. If there is a collision (i.e., another file already has the same hash (Key)), the value is stored with an incremented anti-hash-collision key as illustrated in block 405C. Each block entry stores the value and the anti-collision-index.

To support hash sets that are very big, hash set handling may be supported over several processes (and several buckets). Further, to implement load balancing, the buckets themselves may be split and or merged. For example, when new servers are added to a cluster, existing buckets may be split and redistributed across all of the servers.

Figure 6A:
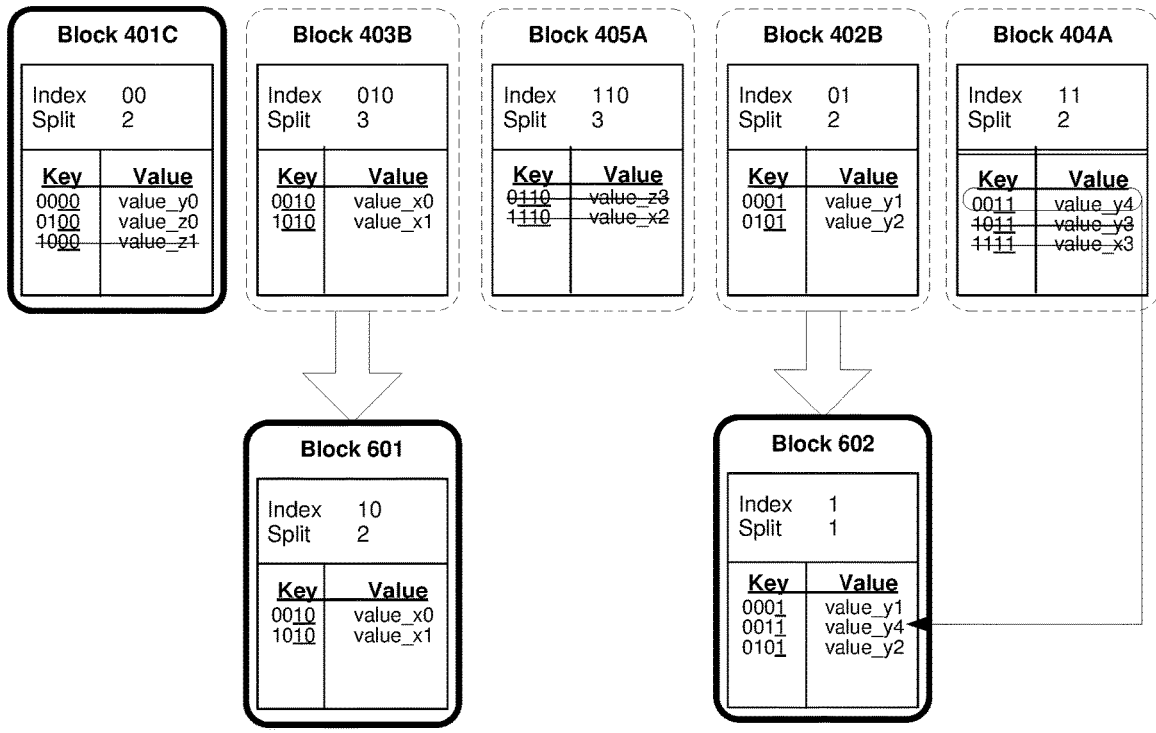
FIG. 6A illustrates an example of merging blocks of a flash registry using on-disk hashing in accordance with an example implementation of this disclosure.

If the combined number of entries would fit in a small enough portion of a block (e.g., less than 2 k of a 4 k block), sibling blocks (i.e., two blocks that are at the same split level and are from the same parent block) may be merged. FIG. 6A illustrates an example of merging blocks of a flash registry using on-disk hashing in accordance with an example implementation of this disclosure.

Following the splits described regarding FIG. 4, the ODH comprises block 401C, block 403B, block 405A, block 402B, and block 404A. Block 403B and block 405A are at the same split level (i.e., split level 3) and are from the same parent block. If, for example, two <KEY, VALUE> entries are removed from block 405A, the combined number of entries (i.e., 2) would fit in a small enough portion of a block. Therefore, the split level and corresponding index width of block 403B may be reduced to form block 601 (which may be at the same address as 403B).

Likewise, block 402B and block 404A are at the same split level (i.e., split level 2) and are from the same parent block. If, for example, a <KEY, VALUE> entry is removed from block 402B and two <KEY, VALUE> entries are removed from block 404A, the combined number of entries (i.e., 2) would fit in a small enough portion of a block. Therefore, the split level and corresponding index width of block 402B may be reduced to form block 602 (which may be at the same address as 402B).

Figure 6B:
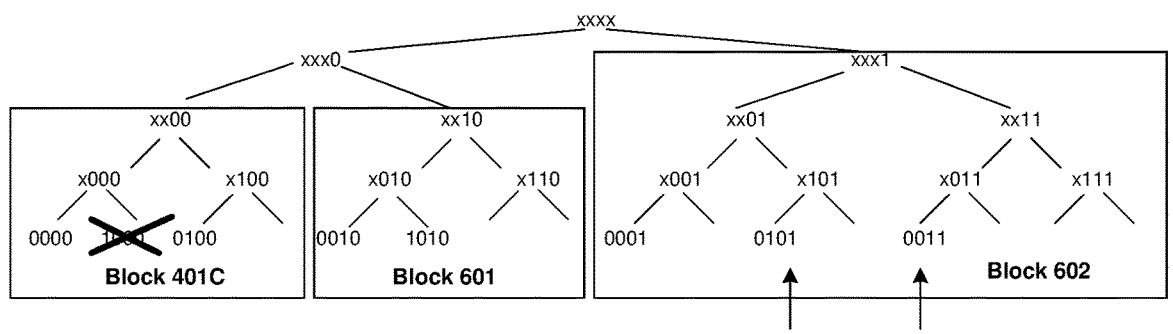
FIG. 6B illustrates an example of entries returned from a directory read operation in accordance with an example implementation of this disclosure.

FIG. 6B illustrates an example of entries returned from a directory read operation in accordance with an example implementation of this disclosure. The directory read operation traverses the on disk hash blocks in regular traversal order and returns the entries in each block by the order of their keys as if the on disk hash was expanded to the maximum level (i.e., inner level+outer level). This is as if a tree is created out of the ODH blocks. As illustrated in FIG. 6B, leafs of the tree are at the fourth level even though none of the blocks (401C, 601 and 601) include four levels.

The files entries in the directory are returned sorted by the bits of their hash in reverse order. This is also the order the files entries would be split into at the highest split level. Because ODH entries are sorted in this manner, once the directory read operation returns a value, a split will not send it forward to be returned a second time.

The directory read operation returns (exactly once) each directory entry that existed when the traversal started and still existed when the traversal ended. The directory read operation may optionally return (at most once) each directory entry that was either created or deleted during the traversal. The directory read operation returns the requested number of directory entries and a "continuation token" allowing the traversal to continue.

Figure 7:
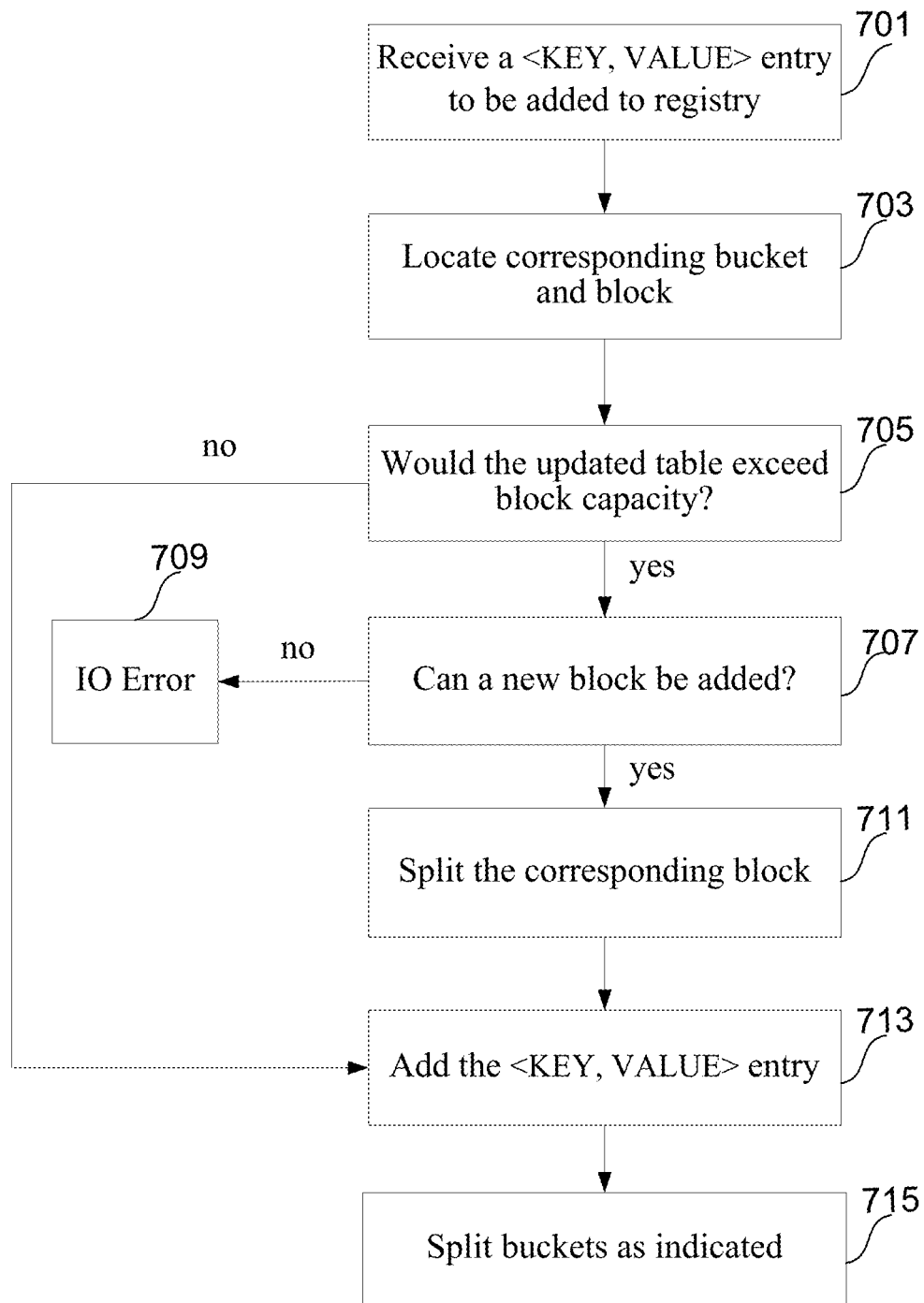
FIG. 7 is a flowchart illustrating a method for adding blocks of a flash registry with on-disk hashing in accordance with an example implementation of this disclosure.

FIG. 7 is a flowchart illustrating an example method for adding blocks of a flash registry with on-disk hashing in accordance with an example implementation of this disclosure. At block 701, a <KEY, VALUE> pair to be added to registry is received by the ODH.

At block 703, the corresponding bucket and block are located according to one or more LSBs of the key. The number of LSBs may be determined according to the current largest split level. If the one or more LSBs do not match an index, the number of LSBs may be reduced by one. The search for a matching index is continued over the blocks having the second largest split level, and so on. For example, if index="11" (assuming the largest split level is 2) is not found, the search continues for index="1" at split level=1.

If adding an additional <KEY, VALUE> entry to the appropriate table, exceeds or nears block capacity at 705, a block split may be necessary. If a new block can be added at 707, a block split may occur at 711. If a new block cannot be added at 707, an IO error may be returned at 709. Reasons why a new block cannot be added include memory capacity and/or processor load.

If the block capacity at 705 was determined to be sufficient or a block split was made at 711, the newly received <KEY, VALUE> pair is added at 713. At 715, a bucket split, as described in FIG. 5, can be made if the DEC indicates that it is necessary.

Figure 8:
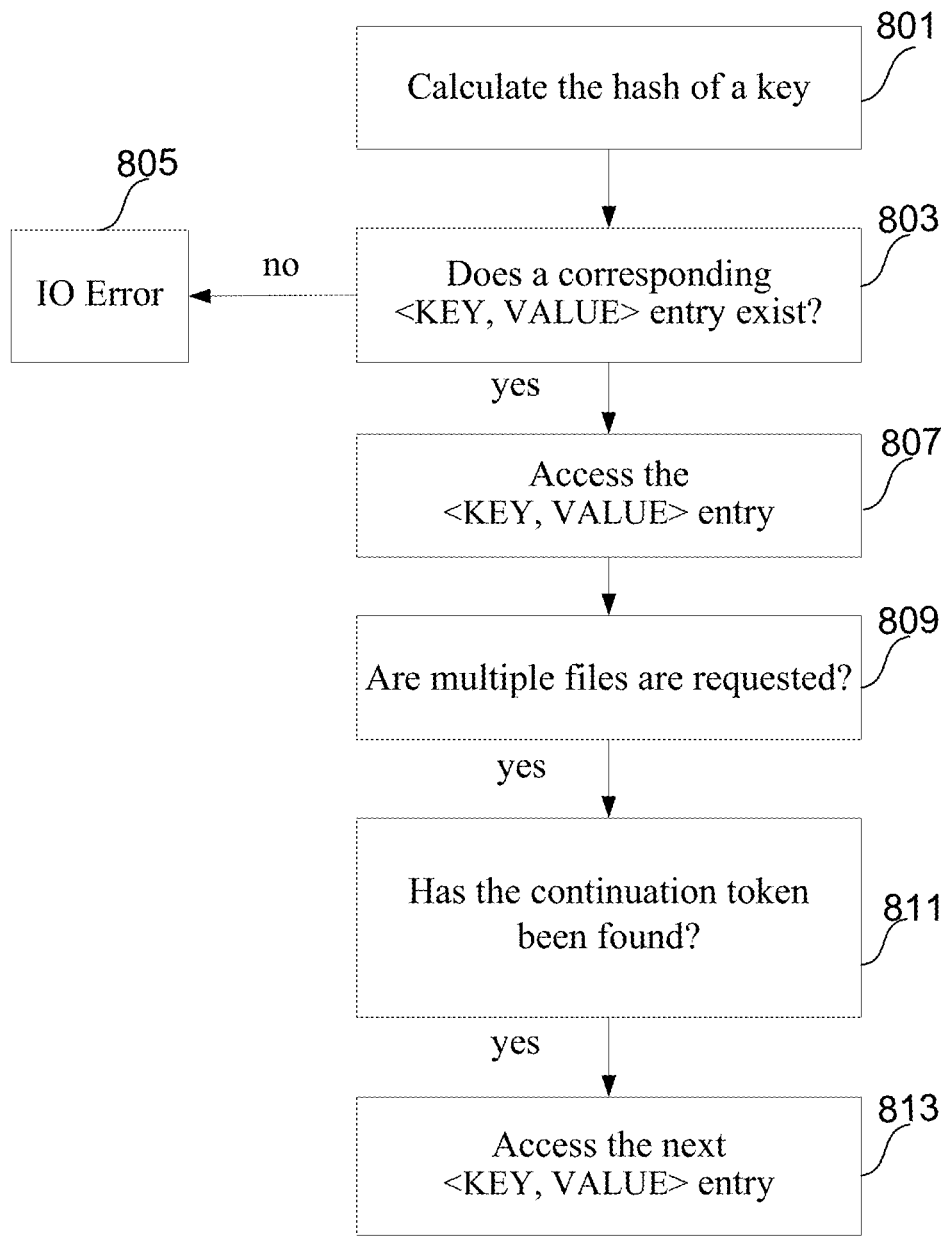
FIG. 8 is a flowchart illustrating a method for accessing blocks of a flash registry with on-disk hashing in accordance with an example implementation of this disclosure.

FIG. 8 is a flowchart illustrating a method for accessing blocks of a flash registry with ODH in accordance with an example implementation of this disclosure. The directory read starts by enumerating all entries while enumerating all blocks.

At block 801, a key hash is calculated over the inodeID of the requested files. The bucket may be selected by the VFS frontend (FE) based on the outer split level. Each FE may store the correct split level for each directory. The inode of the directory may also store the split level. Therefore, the FE may determine the correct split level from the bucket that holds the inode. Furthermore, when a bucket that holds the ODH decides to split, the bucket split is coordinated through the inode.

At block 803, the corresponding bucket and block are searched for according to one or more LSBs of the key. The number of LSBs may be determined according to the current largest split level. If the one or more LSBs do not match an index, the number of LSBs may be reduced by one. The search for a matching index is continued over the blocks having the second largest split level, and so on. For example, if index="11" (assuming the largest split level is 2) is not found, the search continues for index="1" at split level=1. If an entry corresponding to the key is not found at 803, an IO error may be returned at 805.

If an entry corresponding to the key is found at 803, the <KEY, VALUE> entry in the hash table is accessed at 807. If accessed <KEY, VALUE> entry is removed, there is a possibility for merging blocks. If the total number of <KEY, VALUE> entries in the accessed table and its sibling table fit within a single block, the table and its sibling table may be merged into the anchor block.

The directory read operation may request a small number of files in an iterative manner. If multiple files are requested at 809, a search for the next entry may begin at the current block and continue to sibling blocks (i.e., at the same split level). To find the next block, the search may reverse the bits of the index, add 1, and reverse the bits again.

At 811, the directory read operation allows a continuation from any of the entries according to a the continuation token. The results retuned to the directory read operation effectively find the entry in the ODH, even during file creations and deletions. If the committed split level changes during a single directory read operation, the directory read operation may need to jump to the new slice in order to continue. The continuation token allows the traversal to continue from the last entry returned regardless of splits. The continuation token will be the last key (or hash) returned. The last file returned is given a continuation token to support "stateless" listing while the directory may be changing due to splitting and merging. Each entry can get a cookie that the operating system presents back to support the continuing of the listing. This allows the next directory read operation to seek the correct ODH block at 813 and continue from there.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise first "circuitry" when executing a first one or more lines of code and may comprise second "circuitry" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. A system comprising:
   a computing device communicatively coupled to a storage network comprising a plurality of memory blocks, wherein:
      the computing device is operable to maintain a directory structure for managing access to one or more memory blocks of the plurality of memory blocks,
      the directory structure comprises a hash set,
      the directory structure is adaptively resized according to the access of the one or more memory blocks,
      the computing device is operable to maintain a first portion of the directory structure and redistribute a second portion of the directory structure to another computing device, and
      the redistribution of the second portion of the directory structure enlarges the hash set.

2. The system of claim 1, wherein the plurality of memory blocks comprises non-volatile memory.

3. The system of claim 1, wherein the plurality of memory blocks comprises flash memory.

4. The system of claim 1, wherein the access comprises adding or deleting files associated with the directory structure.

5. The system of claim 1, wherein the directory structure comprises one or more registry blocks, and wherein each registry block comprises one or more key-value entries, and wherein each key-value entries correspond to one or more files.

6. The system of claim 5, wherein key-value entries are added to a registry block of the one or more registry blocks until the number of key-value entries exceeds a predetermined capacity, at which time the registry block is split and a new registry block is added to the one or more registry blocks.

7. The system of claim 6, wherein the new registry block is relocated to another computing device.

8. The system of claim 5, wherein key-value entries are removed from a registry block of the one or more registry blocks until the number of key-value entries is at or below a predetermined level, at which time the registry block is merged with another registry block of the one or more registry blocks.

9. The system of claim 1, wherein the storage network comprises a failure resilient address space distributed across a plurality of storage devices.

10. The system of claim 8, wherein each registry block is identified by one or more adaptive indices.

11. A method comprising:
    communicatively coupling a computing device to a storage network comprising a plurality of memory blocks;
    accessing one or more memory blocks of the plurality of memory blocks via the computing device;
    maintaining a directory structure for managing access to the one or more memory blocks, wherein the directory structure comprises a hash set;
    adaptively resizing the directory structure according to the access of the one or more memory blocks;
    maintaining a first portion of the directory structure; and
    redistributing a second portion of the directory structure to another computing device to enlarge the hash set.

12. The method of claim 11, wherein the storage network comprises non-volatile memory.

13. The method of claim 11, wherein the storage network comprises flash memory.

14. The method of claim 11, wherein accessing one or more memory blocks comprises adding or deleting files associated with the directory structure.

15. The method of claim 11, wherein the directory structure comprises one or more registry blocks, and wherein each registry block comprises one or more key-value entries, and wherein each key-value entries correspond to one or more files.

16. The method of claim 15, wherein the method comprises:

adding key-value entries to a registry block of the one or more registry blocks; and if the number of key-value entries exceeds a predetermined capacity, splitting the registry block and adding a new registry block to the one or more registry blocks.

17. The method of claim 16, wherein the method comprises relocating the new registry block to another computing device.

18. The method of claim 16, wherein the method comprises:

removing key-value entries from a registry block of the one or more registry blocks; and if the number of key-value entries is at or below a predetermined level, merging the registry block with another registry block of the one or more registry blocks.

19. The method of claim 11, wherein the storage network comprises a failure resilient address space distributed across a plurality of storage devices.

20. The method of claim 18, wherein each registry block is identified by one or more adaptive indices.

\* \* \* \* \*